United States Patent [19]

Dearman

[11] Patent Number: 4,726,575
[45] Date of Patent: Feb. 23, 1988

[54] APPARATUS FOR ALIGNING PIPES

[76] Inventor: Timothy C. Dearman, P.O. Box 937, Pearland, Tex. 77588

[21] Appl. No.: 915,055

[22] Filed: Oct. 3, 1986

[51] Int. Cl.⁴ .............................................. B23K 1/14
[52] U.S. Cl. ...................................... 269/43; 269/131
[58] Field of Search ......................... 269/43, 130–132; 228/49.3, 44.5; 29/272; 285/21, 22, 411

[56] References Cited

U.S. PATENT DOCUMENTS

| | | | |
|---|---|---|---|
| 3,666,159 | 5/1972 | Watson | 228/49.3 |
| 3,704,503 | 12/1972 | Haywood | 269/131 |
| 3,705,453 | 12/1972 | Olson | 228/44.5 |
| 3,944,202 | 3/1976 | Dearman | 228/49.3 |
| 4,011,979 | 3/1977 | Hayen et al. | 269/132 |

FOREIGN PATENT DOCUMENTS 530365 12/1940 United Kingdom ................ 269/131

Primary Examiner—Robert C. Watson
Attorney, Agent, or Firm—Learman & McCulloch

[57] ABSTRACT

Apparatus for aligning the confronting ends of two pipe sections having a joint therebetween comprising an anchor to which is secured one end of a clamp chain. A retainer carried by the anchor is attached to the chain at a zone which enables the chain to form a loop encircling one pipe section adjacent the joint. The loop carries a plurality of circumferentially spaced supports for supporting the other pipe section in a position to be welded to the first pipe section. The anchor and the retainer are relatively adjustable to enable the loop to be contracted and expanded.

12 Claims, 7 Drawing Figures

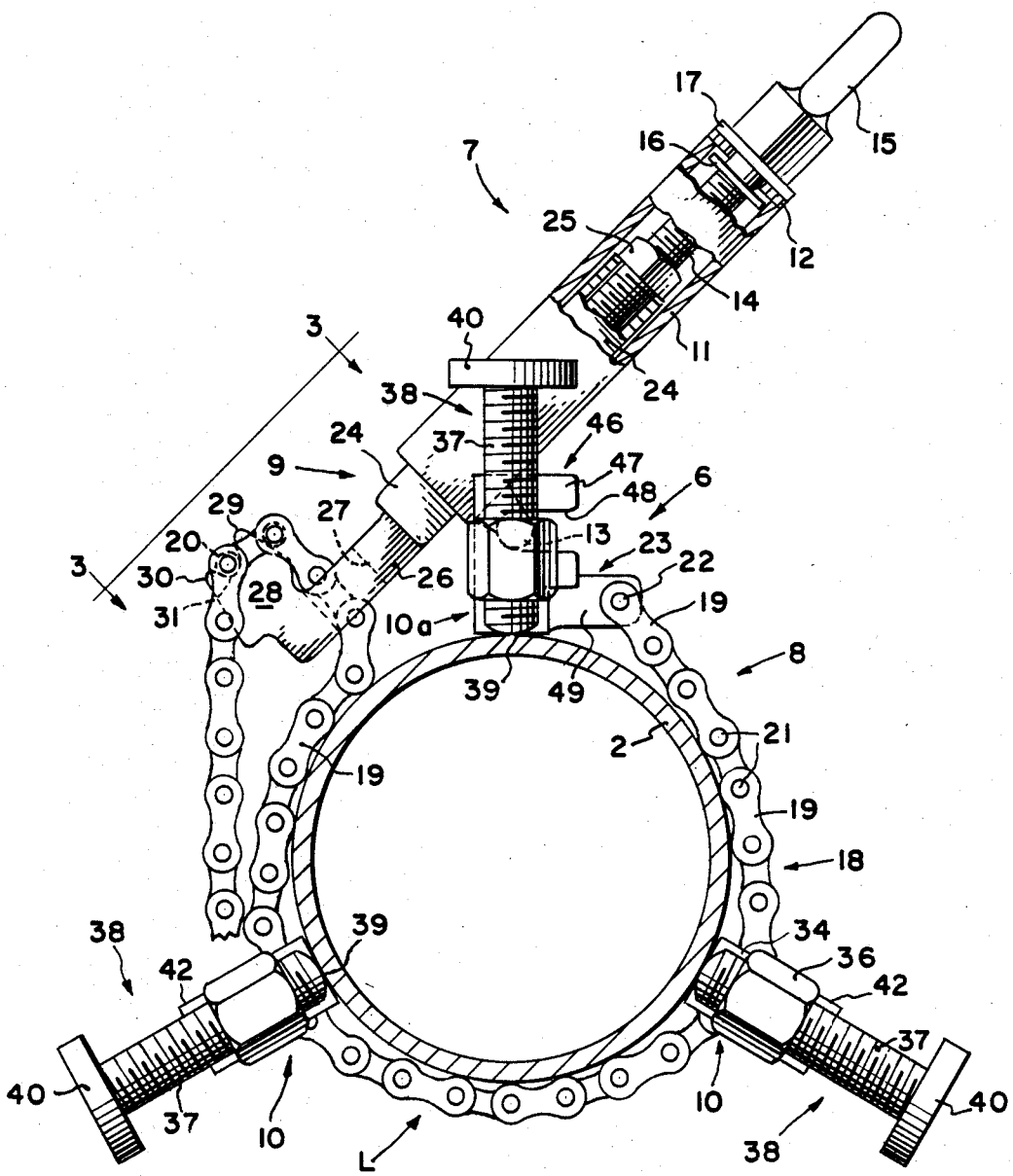
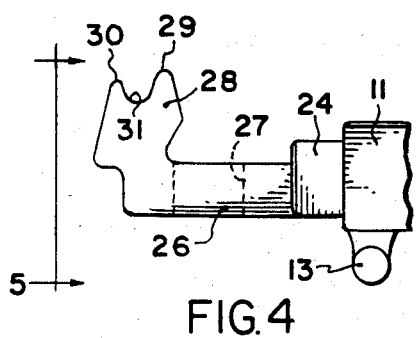
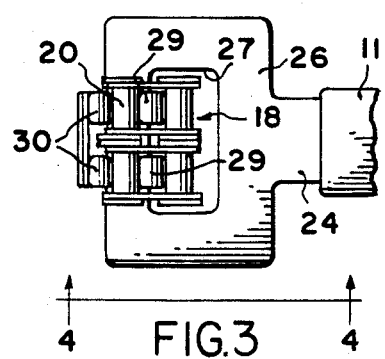
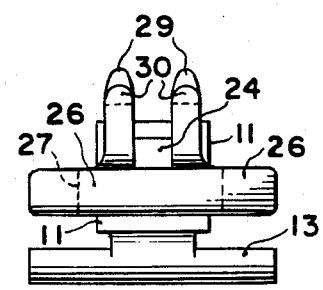
FIG. 1
FIG. 4   FIG. 3   FIG. 5

APPARATUS FOR ALIGNING PIPES

This invention relates to apparatus for aligning the confronting ends of a pair of pipe sections having a joint therebetween so as to position the pipe sections in proper location for welding.

BACKGROUND OF THE INVENTION

Clamps for use in aligning the confronting ends of a pair of pipe sections are well known. Among the best known clamps are those of the kind embodying the inventions disclosed in Dearman Pat. Nos. 3,653,574; 3,901,497; 3,944,202; and 4,586,647. Each of these patents discloses a clamp having a chain of such length as to encircle one of the pipes adjacent its end. The chain is secured at one end to a main block or head member via a fine adjusting mechanism, whereas the opposite end of the chain is threaded through an opening provided in the head and retained therein by a latching mechanism so as to enable the chain to form a loop. That end of the chain which is fixed to the fine adjusting mechanism then may be adjusted so as to expand or contract the loop, as desired. The chain is provided at spaced intervals circumferentially of the loop with a plurality of supports which extend beyond the end of the pipe on which the chain is mounted so as to provide support for the confronting end of the other pipe.

A particular advantage of the known clamps referred to above of is that the size of the loop in each case is adjustable within wide limits, thereby making it possible for a single clamp to be used with pipes of greatly different diameters. In these clamps, however, the presence of a main block or head, separate retaining means, and separate fine adjusting means results in a fairly large number of separate parts, which is reflected in the cost of manufacturing the clamps, as well as in the weight of such clamps. Both cost and weight are important considerations for obvious reasons.

Other aligning clamps are known. Typical of such other clamps are those shown in Watson Pat. Nos. 3,467,295 and 3,666,159; Mori Pat. No. 3,593,402; and Olson Pat. No. 3,705,453. The clamps typified by those disclosed in these patents provide for little, if any, adaptability of such clamps to pipes of greatly different diameters Further, they do not provide for accurate location of the second pipe supports where desired, nor do they make it possible for the clamping chain or other force applying means to be substituted at will for similar chains and the like of different lengths.

Apparatus constructed in accordance with the invention retains the advantageous characteristics of the known clamps, but overcomes or greatly minimizes their disadvantages.

SUMMARY OF THE INVENTION

A pipe alignment clamp constructed in accordance with the invention comprises a flexible clamping chain having at one end a coupling that may be detachably secured to an anchor member and is of such length that it may encircle a pipe adjacent one end thereof and form a loop. At a point remote from the coupling the chain is separably attached to an adjustable retainer that is supported by the anchor member. At spaced intervals about the loop formed by that portion of the chain between the coupling and the retainer are supports which extend transversely of the loop a distance sufficient to project beyond the adjacent one end of the pipe on which the chain is mounted so as to provide support for a second pipe that is to be welded to the one pipe. Each support includes a radially adjustable member that may engage the second pipe and shift the latter bodily relative to the one pipe and effect substantially coaxial alignment of the two pipes.

The anchor member and the retainer of a clamp constructed in accordance with the invention are supported in telescoping relation and are telescopingly adjustable relative to one another in such manner as to enable the size of the loop to be expanded and contracted, thereby enabling fine adjustment of the loop size to be obtained easily. Since the chain is secured at one end to a coupling that is detachable from the anchor member, it is a simple matter to substitute for a chain of one length a chain of a different length, thereby adapting the clamp to a virtually infinite range of pipe sizes. However, the anchor and retaining members may be used with any of the different lengths of chains, thereby making it possible for a single anchor and fine adjusting mechanism to be used with multiple size clamps.

An additional advantage of a clamp constructed in accordance with the invention is that the previously used main block or head member is dispensed with, as well as the separate retaining and fine adjusting means, thereby minimizing the number of parts previously considered necessary, as well as dispensing with the weight of such parts.

THE DRAWINGS

A preferred embodiment of the invention is disclosed in the following description and in the accompanying drawings, wherein:

FIG. 1 is a sectional view taken on the line 1—1 of FIG. 2 and illustrating the clamp in operative condition;

FIG. 3 is an enlarged, fragmentary plan view of a detail taken in the direction of the arrows 3—3 in FIG. 1;

FIG. 4 is a fragmentary, elevational view taken in the direction of the arrows 4—4 in FIG. 3, but with the chain omitted;

FIG. 5 is an elevational view taken in the direction of the arrows 5—5 in FIG. 4;

THE PREFERRED EMBODIMENT

Figure 2:
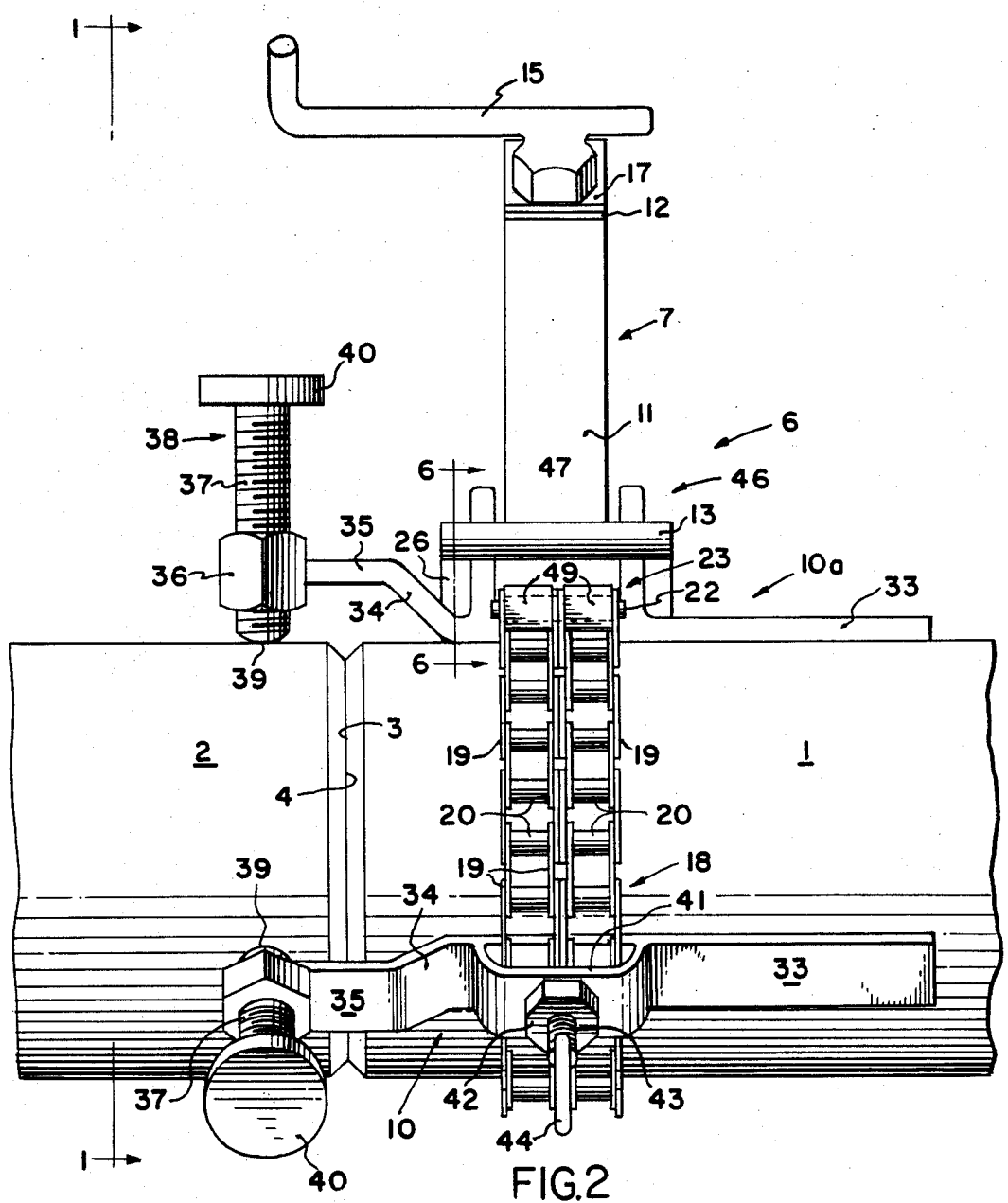
FIG. 2 is a fragmentary side elevational view of the apparatus shown in FIG. 1.
Figures 6, 7:
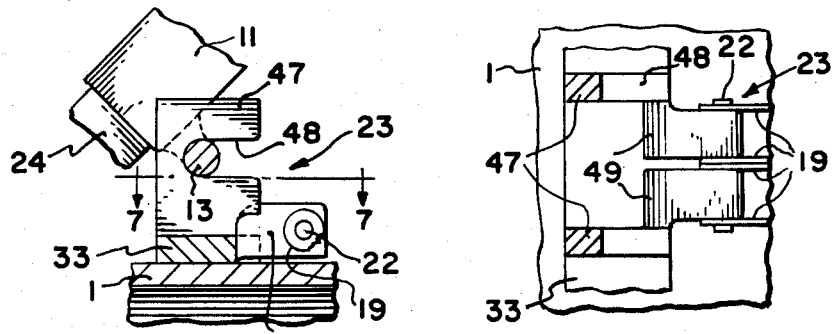
FIG. 6 is a fragmentary, sectional view taken on the lines 6—6 of FIG. 2.
FIG. 7 is a sectional view taken on the lines 7—7 of FIG. 6.

Apparatus constructed in accordance with the invention is adapted for use in aligning a pair of pipe sections 1 and 2 having confronting ends 3 and 4, respectively, in closely spaced or abutting relation so as to enable them to be welded to one another. Conventionally, the confronting ends of the pipe sections are beveled, as is shown in FIG. 2, but they may be of any other conventional form.

When two pipe sections are to be welded to one another, the confronting ends should be so located as to minimize variations in wall thicknesses, configuration, and other irregularities. This objective can best be realized by applying to a first pipe section adjacent the joint between the sections a clamp having supports extending beyond the joint so as to provide support for the confronting end of the second pipe section and equipping the supports with adjustable means by which the second pipe section may be adjusted bodily relative to the first pipe section until the two sections are in proper relative positions to be welded. If necessary or desirable the clamp may be fitted with force applying means to reform, i.e., reshape, the confronting ends of either or both of the pipe sections so as to minimize differences in configuration therebetween.

A clamp constructed in accordance with the invention is designated generally by the reference character 6 and comprises, essentially, an anchor member 7, a flexible clamping member or chain 8, an adjustable retainer 9, and a plurality of supports 10 carried by the chain.

The anchor member 7 comprises a hollow, preferably rectangular body at housing 11 open at one end and closed at the other by a cap 12. Adjacent its open end the housing is provided with a transversely extending coupling bar or lug 13 both ends of which extend beyond the housing 11 as is best shown in FIGS. 2 and 5. The lug 13 forms an anchor point on the clamp member 8. The cap 12 has an opening therein through which extends a threaded adjusting shaft 14. Suitable washers 16 and 17 fixed to the shaft on opposite sides of the cap 12 prevent relative longitudinal movement between the shaft and the body 11, but permit rotation of the shaft by means of a crank 15.

The clamp member 8 preferably comprises a dual stranded roller chain 18 having parallel rows of links 19 spaced by rollers 20 mounted on pins 21, as is conventional. At one end of the chain 18 the links 19 are pivoted by pins 22 to a coupling 23 which will be described in more detail hereinafter. The opposite end of the chain is free.

The retainer 9 comprises a preferably rectangular, hollow body 24 that is telescopingly received within the body 11 of the anchor member 7. At that end of the body 24 which extends into the body 11 is welded a nut 25 through which the threaded shaft 14 extends. The arrangement is such that rotation of the shaft 14 in one direction or the other by means of the crank 15 will effect axial extension or retraction of the retainer 9 relative to the anchor 7.

To that end of the retainer body 24 that projects beyond the anchor member housing 11 is welded or otherwise suitably secured an extension 26 having an opening 27 therein of such area as freely to accommodate the chain 18. Adjacent the free end of the extension 26 is a laterally extending projection 28 provided with two pairs of attaching nodes 29 and 30 spaced by a groove 31. See FIG. 4. The nodes 29 and 30 are of such size as to be accommodated between adjacent rollers 20 of the chain 18, and the diameter and depth of the groove 31 are such as to accommodate a chain roller 20 therein (FIG. 3), thereby enabling that portion of the chain 18 which has been extended through the opening 27 to be attached to the retainer at any selected zone along the chain.

As disclosed herein there are two supports 10 which are identical. Each support 10 comprises an elongate metal bar having a planar section 33 terminating adjacent one end in a riser 34 joined to an extension 35 which lies in a plane parallel to that of the bar section 33. Secured to the free end of the extension 35 is a nut 36 in which the threaded shank 37 of a force applying bolt 38 is threadedly accommodated. One end 39 of the shank 37 is free, whereas the other end is provided with a thumb wheel 40 to facilitate its rotation.

Each support 10 includes an arch 41 which is secured to and overlies a portion of the bar section 33 and provides an opening through which the chain 18 may pass. Secured to the arch 41 is a nut 42 through which the threaded shank 43 of a set screw 44 extends so as to be movable into and out of engagement with the chain 18 and enable the support 10 to be fixed in any selected position along the chain thereby enabling adjustment of the support 10 relative to the chain and retention of the support at any selected position of adjustment relative to the chain. The third support illustrated in the drawings is designated by the reference character 10a and corresponds in many respects to the supports 10. Accordingly, those parts which correspond are designated by the same reference characters.

The support 10a differs from the support 10 primarily by the absence, in the support 10a, of the arch 41. Instead, the bar 33 of the support 10a has welded thereto a clasp 46 forming part of the coupling 23 and comprising a pair of spaced apart ears 47 each of which has a slot 48 of such size and depth as snugly to accommodate the lug 13 that is fixed to the housing 11 of the anchor member 7. The clasp 46 also includes a pair of spaced ears 49 welded to the bar section 33 and to the ears 47 and to which the endmost links 19 of the chain 18 are pivoted by the pins 22.

To condition the apparatus for use, a chain 18 fitted at one end with the clasp 46 and of such length as to encircle the pipe 1 is coupled via the clasp 46 and the lug 13 to the anchor member 7. Since the clasp 46 is an integral part of the support 10a, the latter automatically is located in a position that the bar section 33 may bear against the outer surface of the pipe 1. A suitable number of supports 10 then may be applied to the chain by threading the latter through the openings formed between the arches 41 and the bar sections 33. The free end of the chain then may be threaded through the opening 27 in the extension 26 of the retainer 9 and pulled through the opening until that portion of the chain between the coupling 23 and the extension 26 forms a loop L loosely embracing the pipe 1. The chain may be maintained in its loop-forming position by fitting the pairs of attaching nodes 29 and 30 of the retainer 9 into openings between adjacent rollers 20 of the chain 18.

While the loop L maintains the chain 18 in its loosely embracing relationship with the pipe section 1, the supports 10 may be adjusted circumferentially of the loop L to the desired positions and retained therein by the set screws 44. As shown in FIG. 1, the supports 10 are spaced about 120° from each other and from the support 10a. However, the spacing could be different, if necessary or desirable.

Following circumferential adjustment of the supports 10, the crank 15 may be rotated in such direction as to cause the body 24 of the retainer 29 to be retracted into the housing 11 of the anchor member 7. Such movement will cause the point of attachment of the retainer 9 to the chain 18 to be drawn toward the point (the lug 13) at which the opposite end of the chain is coupled to the anchor member 7, thereby contracting the loop L and clamping the chain tightly about the pipe 1.

Following clamping of the chain tightly about the pipe 1, the end 4 of the pipe 2 is moved into confronting relation with the end 3 of the pipe 1 and the force applying means 38 manipulated so that their free ends 39 engage the pipe 2 and shift it bodily transversely of the pipe 1 until the two pipes are substantially coaxial or the differences therebetween are minimized. If desirable or necessary, the force applying means 38 may be adjusted radially of the pipe 2 so as to reform the latter to the configuration of the confronting end of the pipe 1.

Following positioning and reforming, if necessary, of the pipe 2, the two pipes may be welded to one another in a conventional manner. The risers 34 enable the extensions 35 of the support bars 33 to be spaced radially beyond the outer surfaces of the pipes 1 and 2, thereby enabling a complete weld to be formed while the pipes are maintained in clamped condition.

To remove the clamp from the pipes, it is necessary only to reverse the procedure described to apply the clamp to the pipes.

It is contemplated that the clamping chain 18 will be supplied in different lengths so as to enable a pipefitter to align pipes of greatly differing diameters. In each instance, however, the same anchor member 7 and retainer member 9 may be used, thereby dispensing with the need for multiple loop-forming and adjusting means. However, because each length of chain is capable of forming clamping loops of different sizes, and because the supports 10 are adjustable circumferentially of the loop, a single chain may be used on pipe of greatly differing size.

The disclosed embodiment is representative of a presently preferred form of the invention, but is intended to be illustrative rather than definitive thereof. The invention is defined in the claims.

I claim:

1. Apparatus for aligning confronting ends of a pair of pipe sections having a joint therebetween, said apparatus comprising a flexible clamp member of such length as substantially to encircle one of said pipe sections adjacent said joint; an anchor member; means separably coupling one end of said clamp member to said anchor member; a retainer member having an opening therein and being movably supported by said anchor member, said clamp member slideably extending through said opening; attaching means carried by said retainer member in a position for separable attachment to a portion of said clamp member that has been extended through said opening and at a selected zone sufficiently spaced from said one end of said clamp member to enable that portion of said clamp member between said anchor member and said zone to form a loop embracing said one of said pipe sections; adjusting means reacting between said anchor member and said retainer member for effecting relative movements therebetween in directions to effect selected expansion and contraction of said loop; a plurality of supports carried by said clamp member at spaced intervals between said one end thereof and said zone and projecting laterally of said loop beyond said joint to provide support for the other of said pipe sections; and adjustable force applying means carried by said supports for movement radially of said loop to effect bodily movement of said other of said pipe sections transversely of said one of said pipe sections.

2. Apparatus according to claim 1 wherein said anchor member and said retainer member are in telescoping relation.

3. Apparatus according to claim 1 including means for releasably securing said supports to said clamp member at selected positions of adjustment relative thereto.

4. Apparatus according to claim 1 wherein said anchor member comprises a housing on which said retainer member is slideable.

5. Apparatus according to claim 1 wherein each of said supports comprises an elongate body having a substantially flat section seated on said one of said pipe sections and a terminal extension projecting beyond said joint, said terminal extension being radially spaced beyond said other of said pipe sections.

6. Apparatus according to claim 1 wherein the means coupling said one end of said clamp member to said anchor member is fixed to one of said supports.

7. Apparatus according to claim 6 wherein said anchor member has a lug secured thereto and wherein said coupling means is releasable secured to said lug.

8. Apparatus for aligning confronting ends of a pair of pipe sections having a joint therebetween, said apparatus comprising a flexible, continuous chain of such length as substantially to encircle one of said pipe sections; an anchor housing; coupling means separably connecting one end of said chain to said housing at one end thereof; a retainer member telescopingly accommodated by said housing for reciprocable movements and having a free end projecting beyond said housing; attaching means carried by said retainer member at said free end thereof for separable attachment to said chain at a selected zone thereof sufficiently spaced from said one end thereof to enable that portion of said chain between said anchor member and said zone to form an uninterrupted loop embracing said one of said pipe sections; adjusting means reacting between said housing and said retainer member for effecting relative telescoping movements therebetween in directions to cause movements of said attaching means toward and away from said coupling means and effect selective contraction and expansion of said loop; a first support carried by said cuopling means and projecting laterally of said loop beyond said joint a distance to provide support for the other of said pipe sections; a plurality of other supports carried by said chain at spaced intervals circumferentially of said loop and projecting laterally of the latter beyond said joint a distance to provide support for the other of said pipe sections; adjustable means reacting between each of said other supports and said chain for enabling each of said other supports to be secured on said chain in a selected position of circumferential adjustment relative to said loop; and adjustable force applying means carried each of by said supports for movement radially of said loop to effect bodily movement of said other of said pipe sections transversely of said one of said pipe sections.

9. Apparatus according to claim 8 wherein said coupling means comprises a lug fixed to said anchor housing and a clasp fixed to said one of said supports and in engagement with said lug.

10. Apparatus according to claim 8 wherein said first support is fixed to said coupling means.

11. Apparatus according to claim 8 wherein said first support has a flat surface confronting and bearing on said first pipe section.

12. Apparatus according to claim 8 wherein said chain has a plurality of rollers spaced from one another and herein said attaching means comprises nodes of such size as to be accommodated between adjacent ones of said rollers.

* * * * *

UNITED STATES PATENT AND TRADEMARK OFFICE
CERTIFICATE OF CORRECTION

PATENT NO.  : 4,726,575
DATED       : February 23, 1988
INVENTOR(S) : Timothy C. Dearman It is certified that error appears in the above-identified patent and that said Letters Patent is hereby corrected as shown below:

Column 3, line 14, change "at", first occurrence, to -- or -- .

Column 6, line 15, change "releasable" to -- releasably -- ;

line 63, change "herein" to -- wherein -- .

Signed and Sealed this

Twelfth Day of July, 1988

Attest:

DONALD J. QUIGG

Attesting Officer

Commissioner of Patents and Trademarks